US008855714B2

(12) United States Patent
Edrey

(10) Patent No.: US 8,855,714 B2
(45) Date of Patent: Oct. 7, 2014

(54) REMOVABLE MEDIA PLAYER FOR MOBILE PHONES

(75) Inventor: Ayelet Edrey, Haifa (IL)

(73) Assignee: Sandisk IL Ltd., Kfar Saba (IL)

( * ) Notice: Subject to any disclaimer, the term of this patent is extended or adjusted under 35 U.S.C. 154(b) by 2230 days.

(21) Appl. No.: 11/519,970

(22) Filed: Sep. 13, 2006

(65) Prior Publication Data

US 2007/0078917 A1    Apr. 5, 2007

Related U.S. Application Data

(60) Provisional application No. 60/716,573, filed on Sep. 14, 2005, provisional application No. 60/754,421, filed on Dec. 29, 2005.

(51) Int. Cl.

| H04H 40/00 | (2008.01) |
|---|---|
| H04M 1/725 | (2006.01) |
| H04M 3/42 | (2006.01) |
| H04B 1/38 | (2006.01) |
| G06Q 30/06 | (2012.01) |
| H04M 1/02 | (2006.01) |

(52) U.S. Cl.
CPC ........... *G06Q 30/06* (2013.01); *H04M 1/72527* (2013.01); *H04M 2250/14* (2013.01); *H04M 1/0254* (2013.01); *H04M 1/72558* (2013.01)
USPC .... 455/557; 455/3.06; 455/412.1; 455/414.1; 455/558

(58) Field of Classification Search
USPC .......... 455/3.06, 410–412.1, 414.1, 418–420, 455/557–559
See application file for complete search history.

(56) References Cited

U.S. PATENT DOCUMENTS

| 4,338,644 A | 7/1982 | Staar |
|---|---|---|
| 5,404,485 A | 4/1995 | Ban |
| 5,799,168 A | 8/1998 | Ban |

(Continued)

FOREIGN PATENT DOCUMENTS

| EP | 0 322 037 A1 | 6/1989 |
|---|---|---|
| EP | 1 100 001 | 5/2001 |

(Continued)

OTHER PUBLICATIONS

Official Action for U.S. Appl. No. 11/016,777 (Aug. 30, 2010).

(Continued)

*Primary Examiner* — Simon Nguyen
(74) *Attorney, Agent, or Firm* — Jenkins, Wilson, Taylor & Hunt, P.A.

(57) ABSTRACT

A digital media device for providing digital media services to a mobile phone is disclosed. In exemplary embodiments, the device includes: a phone memory card that is reversibly deployable to a port of the mobile phone; and a digital media-player application residing on the phone memory card, wherein the combination of the digital media device and the mobile phone is operative to effect a playback of a media file, using the digital media-player application and using at least one of: an operating system; user controls; a visual display system, and an audio system. Optionally, the device further includes: a digital rights-management engine residing on the phone memory card for providing digital rights-management services for at least one media file. Optionally, the device further includes: a media-download engine operative to effect a download of at least one media file into the non-volatile memory.

28 Claims, 5 Drawing Sheets

(56) References Cited

U.S. PATENT DOCUMENTS

| | | | |
|---|---|---|---|
| 5,831,946 | A | 11/1998 | De Bie |
| 5,890,015 | A | 3/1999 | Garney et al. |
| 5,928,847 | A | 7/1999 | Visconte et al. |
| 5,930,472 | A | 7/1999 | Smith |
| 5,966,720 | A | 10/1999 | Itoh et al. |
| 6,148,354 | A | 11/2000 | Ban et al. |
| 6,182,204 | B1 | 1/2001 | Nakashima |
| 6,188,650 | B1 | 2/2001 | Hamada et al. |
| 6,256,690 | B1 | 7/2001 | Carper |
| 6,279,069 | B1 | 8/2001 | Robinson et al. |
| 6,360,057 | B1 | 3/2002 | Tsumagari et al. |
| 6,388,961 | B1 | 5/2002 | Ijichi |
| 6,405,278 | B1 | 6/2002 | Liepe |
| 6,484,290 | B1 | 11/2002 | Chien et al. |
| 6,504,571 | B1 | 1/2003 | Narayanaswami et al. |
| 6,581,122 | B1 | 6/2003 | Sarat |
| 6,594,361 | B1 | 7/2003 | Chaney et al. |
| 6,657,679 | B2 | 12/2003 | Hayes et al. |
| 6,757,783 | B2 | 6/2004 | Koh |
| 6,779,063 | B2 | 8/2004 | Yamamoto |
| 6,804,749 | B2 | 10/2004 | Chien et al. |
| 6,886,083 | B2 | 4/2005 | Murakami |
| 6,961,585 | B2 * | 11/2005 | Minematsu ............... 455/556.1 |
| 7,054,660 | B2 * | 5/2006 | Lord ............................ 455/558 |
| 7,099,239 | B2 | 8/2006 | Ogikubo |
| 7,107,045 | B1 * | 9/2006 | Knoop ..................... 455/414.1 |
| 7,130,608 | B2 * | 10/2006 | Hollstrom et al. ........... 455/403 |
| 7,301,857 | B2 | 11/2007 | Shah et al. |
| 7,426,584 | B2 | 9/2008 | Moran et al. |
| 2001/0037420 | A1 | 11/2001 | Sakamoto |
| 2002/0099797 | A1 | 7/2002 | Merrell et al. |
| 2003/0120604 | A1 | 6/2003 | Yokota et al. |
| 2003/0154326 | A1 | 8/2003 | Tseng et al. |
| 2004/0008970 | A1 | 1/2004 | Junkersfeld et al. |
| 2004/0028068 | A1 | 2/2004 | Kizhepat |
| 2004/0073727 | A1 | 4/2004 | Moran et al. |
| 2004/0209651 | A1 * | 10/2004 | Tsukamoto ................. 455/558 |
| 2004/0235521 | A1 * | 11/2004 | Pradhan et al. ............. 455/558 |
| 2005/0157600 | A1 | 7/2005 | Teicher |
| 2006/0154648 | A1 * | 7/2006 | Oh et al. .................... 455/411 |

FOREIGN PATENT DOCUMENTS

| | | |
|---|---|---|
| EP | 1 411 520 A2 | 4/2004 |
| JP | 03-222148 | 10/1991 |
| JP | 11-273230 | 10/1999 |
| JP | 2000-013237 A | 1/2000 |
| JP | 2000-331422 | 11/2000 |
| JP | 2001195553 | 7/2001 |
| JP | 2001-229657 | 8/2001 |
| JP | 2003-259303 | 9/2003 |
| WO | WO 2005/067377 A2 | 7/2005 |

OTHER PUBLICATIONS

Japanese Final Official Action for Japanese Patent Application No. 2006-548474 (Apr. 30, 2010).
Final Official Action for U.S. Appl. No. 11/016,777 (Apr. 7, 2010).
Japanese Official Action for Japanese Patent Application No. 2006-548574 (Oct. 23, 2009).
Communication pursuant to Article 94(3) EPC for European application No. 04806679.9 (Oct. 23, 2009).
Official Action for U.S. Appl. No. 11/016,777 (Sep. 14, 2009).
Official Action for U.S. Appl. No. 11/016,777 (Sep. 2, 2009).
Restriction Requirement for U.S. Appl. No. 11/016,777 (Jul. 13, 2009).
European Search Report for European application No. 04806679.9 (Aug. 14, 2008).
Notice of Allowance and Fee(s) Due for U.S. Appl. No. 10/268,892 (Dec. 19, 2007).
Interview Summary for U.S. Appl. No. 10/268,892 (Nov. 16, 2007).
Final Official Action for U.S. Appl. No. 10/268,892 (Jul. 17, 2007).
Official Action for U.S. Appl. No. 10/268,892 (Feb. 20, 2007).
Advisory Action for U.S. Appl. No. 10/268,892 (Jun. 1, 2006).
Final Official Action for U.S. Appl. No. 10/268,892 (Apr. 6, 2006).
Notification of Transmittal of the International Search Report and the Written Opinion of the International Searching Authority, or the Declaration for International Application No. PCT/IL2004/01148 (Dec. 21, 2005).
Official Action for U.S. Appl. No. 10/268,892 (Oct. 25, 2005).
Advisory Action for U.S. Appl. No. 10/268,892 (Jul. 20, 2005).
Final Official Action for U.S. Appl. No. 10/268,892 (May 18, 2005).
Official Action for U.S. Appl. No. 10/268,892 (Nov. 29, 2004).
Advisory Action for U.S. Appl. No. 10/268,892 (Sep. 16, 2004).
Final Official Action for U.S. Appl. No. 10/268,892 (Jun. 30, 2004).
Official Action for U.S. Appl. No. 10/268,892 (Mar. 4, 2004).
Official Action for U.S. Appl. No. 10/268,892 (Dec. 19, 2003).
Ban, "Local Flash Disks: Two Architectures Compared," White Pater, M-Systems Flash Disk Pioneers (Aug. 2001).
Glass, "There in a Flash: Flash Memory for Embedded Systems," available at www.embedded.com (Copyright 2000).
INTEL AP-686 Application Note, "Flash File System Selection Guide," (Dec. 1998).
Appeal Docketing Notice for U.S. Appl. No. 11/016,777 (Feb. 22, 2013).
Examiner's Answer to Appeal Brief for U.S. Appl. No. 11/016,777 (Dec. 12, 2012).
Final Official Action for U.S. Appl. No. 11/016,777 (Nov. 2, 2011).
Interview Summary for U.S. Appl. No. 11/016,777 (Aug. 17, 2011).
Official Action for U.S. Appl. No. 11/016,777 (May 9, 2011).

* cited by examiner

REMOVABLE MEDIA PLAYER FOR MOBILE PHONES

This patent application claims the benefit of U.S. Provisional Patent Application No. 60/716,573 filed Sep. 14, 2005, and No. 60/754,421 filed Dec. 29, 2005.

FIELD AND BACKGROUND OF THE INVENTION

The present invention relates to apparatus and methods for configuring a mobile phone as a portable digital media-player.

A portable digital media-player (herein referred to as a PDMP) is well-known in the art of consumer electronics, and is typically packaged as a battery-operated portable device. A PDMP typically includes a memory module, audio playback circuitry (for example, including an audio decoder), a communication port, and optionally digital rights-management (DRM) program code.

A well-known example of such a device is the iPod®, available from Apple® Computer, Inc., Cupertino, Calif. A well-known website for acquiring media for a PDMP is the virtual media store of iTunes®, located at www.apple.com/itunes and managed by Apple® Computer, Inc., Cupertino, Calif.

A state-of-the-art PDMP, which is typically carried by a user, needs to be charged periodically depending on usage. As most users carry a battery-operated communication device (e.g. a mobile phone) as well, it is useful to have the functionality of a PDMP integrated into a mobile phone. A prior art mobile phone that includes PDMP (e.g. an iPod) functionality is the Rokr E1 phone available from Motorola Inc., Schaumburg, Ill. However, this solution requires the user to have a specific model of a mobile phone, preventing the user from transferring his/her PDMP from one mobile phone to another.

It would be highly desirable to have a removable PDMP that could be ported (i.e. transferred) from one mobile phone to another. In addition, such a PDMP could employ certain mobile phone resources, for example, the battery, screen, communication functionality, user controls, and audio system.

SUMMARY OF THE INVENTION

According to the present invention, there is provided for the first time a digital media device for providing digital media services to a mobile phone, the device including: (a) a phone memory card that is reversibly deployable to a port of the mobile phone (i.e. to operatively link the memory card to the mobile phone); and (b) a digital media-player application residing on the phone memory card (i.e. an on-board application that is stored in and/or permanently 'burned' on read-only non-volatile memory of the memory card), wherein the combination of the digital media device and the mobile phone is operative to effect a playback of a media file, using the digital media-player application (i.e. by executing the digital media-player application) and using at least one of: (i) an operating system of the mobile phone; (ii) user controls of the mobile phone; (iii) a visual display system of the mobile phone, and (iv) an audio system of the mobile phone.

As used herein, a "portable digital media-player" and "PDMP" refer to a device operative to playback at least audio or video media files. A "combination of the digital media device and the mobile phone" is used herein to refer to a combination in which a phone memory card of a media device is deployed, coupled, or interfaced to the mobile phone via a mobile phone port, for example, a memory slot of the mobile phone. As used herein when an engine (i.e. code engine) or application 'resides in' or 'resides on' a memory card (or is designated as 'on-board'), this refers to the case where the engine or application is stored in non-volatile memory of the memory card.

Although not a requirement, in some embodiments, the residing application or engine (for example, digital media-player application) is stored in read-only non-volatile memory of the memory card. Furthermore, embodiments where the application or engine is stored at least in part in writable (i.e. other than read-only) non-volatile memory are also contemplated by the present inventor.

The present invention provides systems and methods for using a portable digital media-player in a mobile phone. The present invention teaches a PDMP, with the form factor and functionality of a mobile phone, having a memory card slot and memory card. Mobile phones that are compatible with portable memory cards are well-known in the art. An example is the RS-DV-MMC memory card slot in the Nokia 6680 mobile phone available from Nokia, Finland. Memory cards compatible with this memory card slot are available from M-Systems Ltd., Kefar Saba, Israel.

According to exemplary embodiments, the presently disclosed memory card digital media device includes storage for media (e.g. image, audio, and video) files, storage for software applications (including DRM and media-player applications configured to run on the processor of a mobile phone), and a DRM key. Furthermore, in exemplary embodiments, the memory card digital media device includes a DRM application or engine configured to communicate with a virtual (i.e. Internet-based) media store, where the DRM application can download media after obtaining authorization using the DRM key. The DRM application is not a required to run, and may be bypassed when downloading media files that do not support DRM (e.g. MP3 files). The media-player application can play media from the storage of the memory card through the audio system of the mobile phone.

When a user wishes to use the media-player functionality, he/she may, for example, launch the media-player application, which is stored on the memory card, through the existing mobile-phone interface using existing mobile phone controls. Once the user has done so, he/she can operate the application as if he/she was operating a PDMP. For example, in order to play a song, the user browses through a song list, chooses a song to play, and selects the "Play" option through the interface of the mobile-phone operating system using the conventional input methods of the mobile phone. As in the case of a PDMP, the DRM application, in exemplary embodiments, verifies the user's right to play the song using the DRM key, which is saved on the memory card, and then plays the song.

When the user moves the PDMP card (i.e. memory card) to another mobile phone, the media-player application becomes available on the operating system of the second mobile phone. Existing operating systems, such as PalmOS® available from PalmSource™, Sunnyvale, Calif., are able to launch the media-player application from the memory card as if the application is stored on the mobile phone's memory rather than on the memory card. The user's DRM key is stored on the memory card, and therefore the DRM application is able to validate the user's right to play media on the second mobile phone. In order to acquire (i.e. buy, rent, or download) a media file, the user connects via the mobile phone, or via a personal computer, to the virtual media store.

Therefore, according to some embodiments, the digital media-player application is operative to execute under the operating system of the mobile phone when the phone memory card is deployed to the port of the mobile phone.

According to some embodiments, the digital media-player application is executable by a CPU of the mobile phone when the phone memory card is deployed to the port of the mobile phone.

According to some embodiments, the port is a mobile phone memory slot.

According to some embodiments, the memory slot is an MMC memory slot.

According to some embodiments, the phone memory card is configured to connect to the memory slot using a Secure Digital™ standard.

According to some embodiments, the combination of the digital media device and the mobile phone is operative to effect an iPOD™ emulation.

According to some embodiments, the device further includes: (c) a digital rights-management engine (i.e. onboard residing on the memory card) residing on the phone memory card for providing digital rights-management services for at least one media file.

According to some embodiments, the digital rights-management engine is operative to handle acquisition of digital media rights for at least one media file, wherein the handling includes at least one of: (i) generating a request for digital rights for at least one media file; and (ii) modifying stored digital rights data for at least one media file.

According to some embodiments, the device further includes: (d) a digital rights by-pass mechanism (i.e. onboard residing on the memory card) invokable upon playback of an unprotected the media file.

According to some embodiments, the digital media-player application is operative to provide video playback services to the mobile phone so that the playback includes video playback.

According to some embodiments, the device further includes: (c) a non-volatile memory for storing at least one media file, the non-volatile memory residing on the phone memory card, wherein the digital media-player application is operative to effect the playback of a stored media file stored in the non-volatile memory residing on the phone memory card.

According to some embodiments, the device further includes: (d) a file-selection user-interface application (i.e. onboard residing on the memory card) residing on the memory card for selecting, using the mobile phone, for playback of at least one of: (i) a local media file stored in the non-volatile memory; and (ii) a remote media file accessible using a communications system of the mobile phone.

According to some embodiments, the file selection user-interface application is a menu-based application.

According to some embodiments, the file selection user-interface application is a search-based application.

According to some embodiments, the device further includes: a media-download engine (i.e. onboard download engine) operative to effect a download, using a communication system of the mobile phone, of at least one media file into the non-volatile memory.

According to some embodiments, the user controls are configured to control the download engine upon the deployment.

According to some embodiments, the media-download engine is operative to download digital media-player application code on the phone memory card.

According to some embodiments, the digital media-player application resides in read-only non-volatile memory of the memory card.

According to the present invention, there is provided for the first time a method for media playback, the method including the steps of: (a) providing a phone memory card including an on-board digital media-player application; and (b) reversibly deploying the phone memory card to a first mobile phone to configure the first mobile phone as a digital media player for playback of digital media files using the on-board digital media-player application.

According to some embodiments, the phone memory card includes an on-board digital rights-management application and the deploying is operative to configure the first mobile phone as a digital right-management-enabled-digital media player.

According to some embodiments, the method further includes the step of: (c) effecting a playback of a first set of at least the digital media file stored in the phone memory card, using at least one of: (i) an operating system of the first mobile phone; (ii) user controls of the first mobile phone; (iii) a visual display system of the first mobile phone, and (iv) an audio system of the first mobile phone.

According to some embodiments, the method further includes the steps of: (d) disengaging the memory card from the first mobile phone; (e) deploying the memory card to a second mobile phone different from the first mobile phone; and (f) effecting a playback of a second set of at least one the digital media file stored in the phone memory card, using at least one of: (i) an operating system of the second mobile phone; (ii) user controls of the second mobile phone; (iii) a visual display system of the second mobile phone; and (iv) an audio system of the second mobile phone.

According to some embodiments, the first set and the second set are the same set.

According to some embodiments, the method further includes the steps of: (d) before the effecting of the playback, carrying out at least one of the following: (i) confirming DRM media rights for digital media playback on the first mobile phone; and (ii) purchasing the DRM media rights using a DRM application residing on the memory card.

According to some embodiments, the method further includes the step of: (c) effecting a downloading of media files into the phone memory card using a communication system of the first mobile phone and an on-board media-download engine residing on the memory card.

According to some embodiments, the phone memory card is reversibly-deployable to a second mobile phone to configure the second mobile phone as a digital media player for playback of digital media files using the on-board digital media-player application.

According to the present invention, there is provided for the first time a system for playing media, the system including: (a) a first mobile phone and a second mobile phone; and (b) a media-player card having a media-player functionality when operationally connected to the mobile phones, the media-player card configured to be transferred from the first mobile phone to the second mobile phone, thereby enabling the media to play on either the mobile phone.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems and methods for using a portable digital media-player in a mobile phone. The principles and operation for using a portable digital media-player in a mobile phone, according to the present invention, may be better understood with reference to the accompanying description and the drawings.

Figure 1:
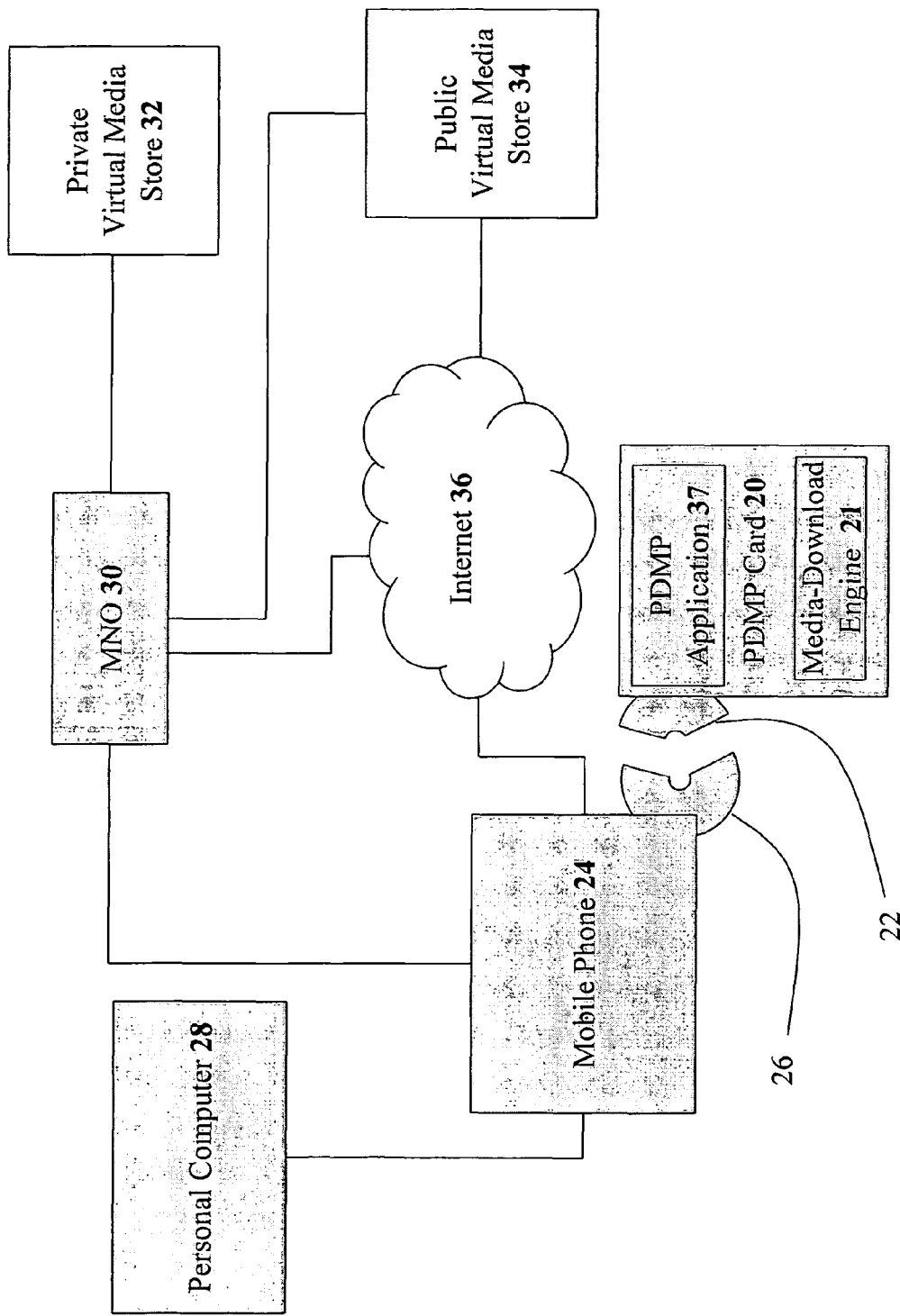
FIG. 1 is a simplified block diagram of a PDMP card and the components that the card communicates with, according to a preferred embodiment of the present invention.

Referring now to the drawings, FIG. 1 is a simplified block diagram of a PDMP card and the components that the card communicates with, according to a preferred embodiment of the present invention. A PDMP card 20, having a media-download engine 21 and a connector 22, which connects to a mobile phone 24 (for example, a cellular telephone) via a socket 26 are shown. Connector 22 and socket 26 are configured according to one of the standards for connecting memory cards to mobile phones such as the SD™ (Secure Digital™) standard, defined by the SD Card Association, San Ramon, Calif.

Media content can be downloaded to PDMP card 20, via media-download engine 21, in several different ways. One way is to connect mobile phone 24 to, and download media content from, a personal computer 28 via known methods such as infra-red or USB cable. A second way is to download content from an MNO 30 (i.e. mobile network operator). MNO 30 may obtain the content in various ways, which includes downloading the content from a private virtual media store 32 or a public virtual media store 34. A third way is to connect mobile phone 24 to an internet 36 (e.g. the Internet) (either via MNO 30 or directly through communication methods such as Wi-Fi), and download content from public virtual media stores 34. A PDMP application 37 serves as a fully-functional media player. Media-download engine 21 can also be configured to check for updates of PDMP application 37, and download such updates to PDMP card 20.

When the user inserts PDMP card 20 into mobile phone 24, PDMP application 37 is visible to the phone's operating system and the phone's operating system can enable the user to launch PDMP application 37 that resides on the media-player card 20. As mentioned above, operating systems, such as PalmOS®, are able to launch PDMP application 37 from PDMP card 20 as if it was stored on the memory of mobile phone 24 rather than on PDMP card 20. If the user activates PDMP application 37, the operating system of mobile phone 24 runs PDMP application 37 from PDMP card 20 on the CPU of mobile phone 24. PDMP application 37, like any conventional PDMP, offers the user the options to select an item from the local library on PDMP card 20, or to select an item from virtual media stores 32 or 34 via the communication system of mobile phone 24, or search for a musical item using conventional search engines.

Once a song that is not resident on PDMP card 20 is selected, mobile phone 24 connects to the location of that musical item, typically a music store or a peer-to-peer file exchange system, and downloads the musical item to mobile phone 24 or to PDMP card 20. If this downloading requires clearing DRM rights, PDMP application 37 optionally supports the transaction. In order to playback the musical item, which is now in PDMP card 20 (i.e. stored in non-volatile memory), PDMP application 37 (for example, stored in non-volatile memory of the card 20) plays the music from the file on PDMP card 20. By the same method, a video item can be downloaded and played. If the musical item is protected by a DRM, the protection rules apply, and PDMP application 37 will not play the music beyond the limitation of the license.

In exemplary embodiments, PDMP Card 20 (and code residing on PDMP card 20, such as PDMP application 37) offers the user (i.e. via an interface of the mobile phone 24) basic means for managing the stored multimedia files, such as storing in folders, deleting, renaming etc. In exemplary embodiments, all features traditionally found in PDMPs reside on PDMP card 20.

Figure 2:
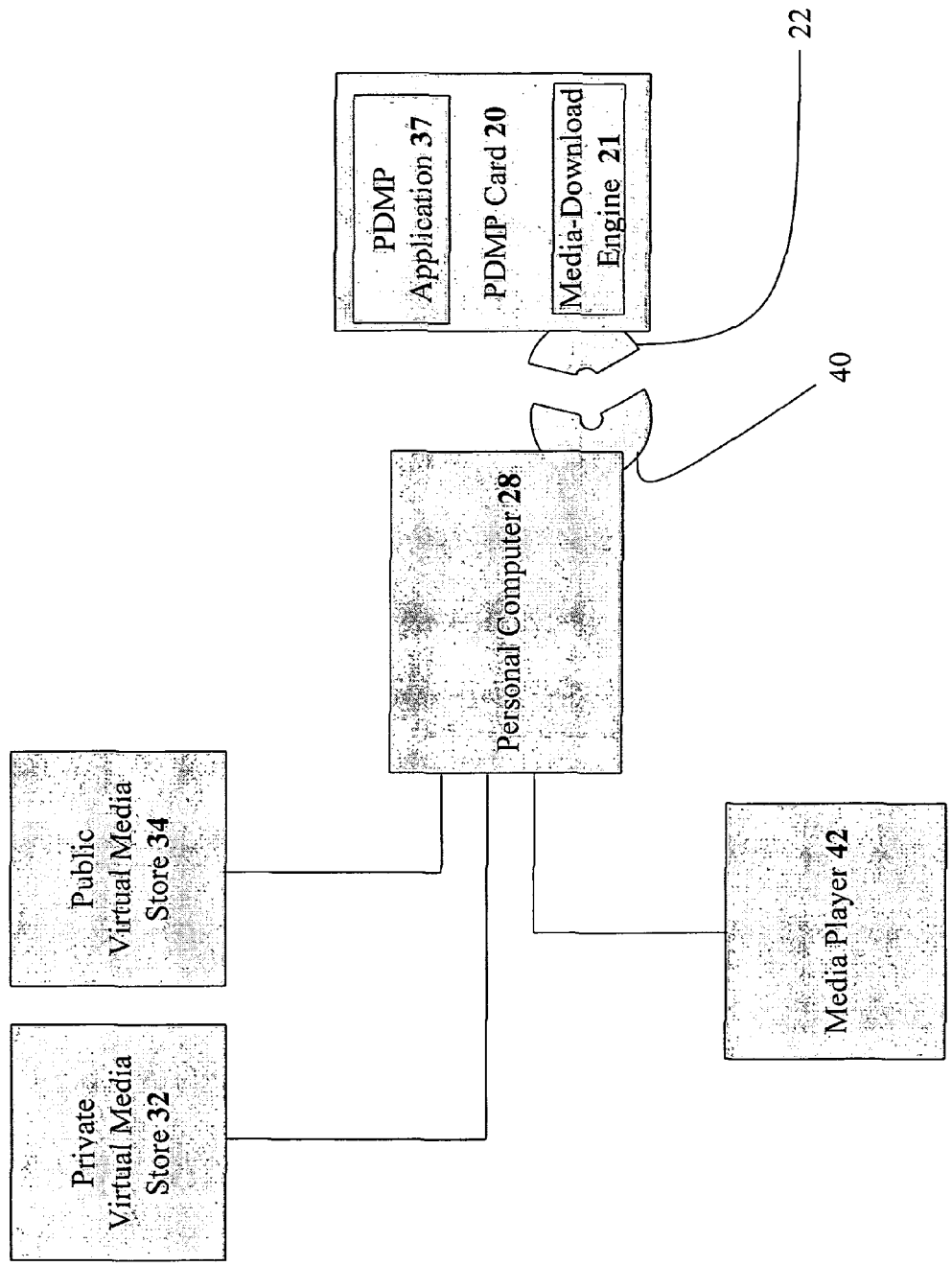
FIG. 2 is a simplified block diagram of the PDMP card of FIG. 1 and the components for downloading content into the PDMP card via a personal computer, according to a preferred embodiment of the present invention.

Another method for download media content into PDMP card 20 is shown in FIG. 2. FIG. 2 is a simplified block diagram of the PDMP card of FIG. 1 and the components for downloading content into the PDMP card via a personal computer, according to a preferred embodiment of the present invention. In this embodiment, personal computer 28 includes a memory card slot 40 for connecting PDMP card 20 via connector 22. Once PDMP card 20 is inserted into card slot 40, content can be downloaded onto PDMP card 20 directly from personal computer 28, or through various media content sources such as a media player 42 or virtual media stores 32 and 34.

Figure 3:
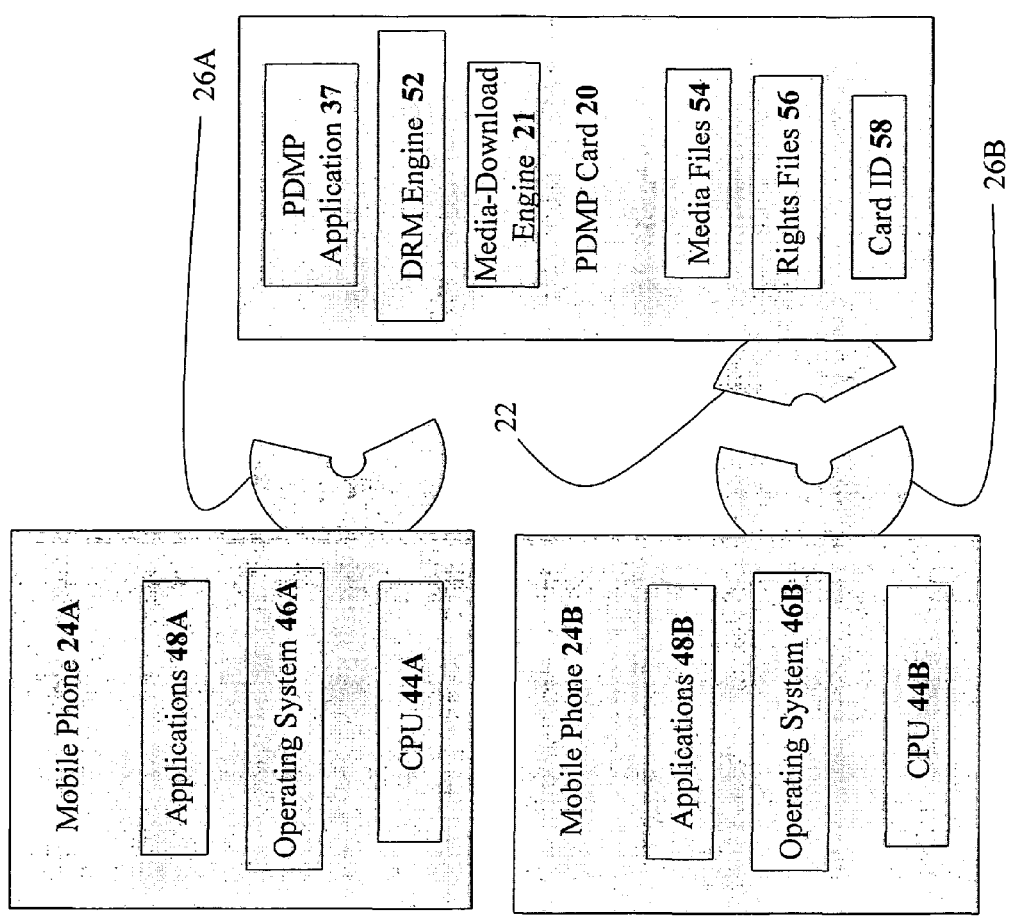
FIG. 3 shows a simplified block diagram of the PDMP card of FIG. 1 being ported from one mobile phone to another mobile phone, according to a preferred embodiment of the present invention.

FIG. 3 shows a simplified block diagram of the PDMP card of FIG. 1 being ported from one mobile phone to another mobile phone, according to a preferred embodiment of the present invention. A mobile phone 24A, having a CPU 44A and an operating system 46A, is shown with running applications 48A that are saved on a memory card inside mobile phone 24A. PDMP card 20 is inserted into mobile phone 24A via connector 22 with a socket 26A of mobile phone 24A. Operating system 46A of mobile phone 24A recognizes the presence of PDMP card 20, and enables CPU 44A to select and run applications (namely, PDMP application 37 and a DRM engine 52) that reside on PDMP card 20. In addition, the exemplary PDMP card 20 contains non-volatile storage (for example, flash memory) for storing media files 54 and/or media rights files 56.

In exemplary embodiments, when a user selects a media item to play (i.e. when the code of PDMP application 37 is executed, for example, by CPU 44), mobile phone operating system 46A launches DRM engine 52, which verifies the DRM rights (via DRM rights files 56) of PDMP card 20 based on the media item selected, a card ID 58, the time/date (obtained from mobile phone 24A), and the communication method of mobile phone 24A. In some implementations, if the DRM rights are verified, operating system 46A then launches PDMP application 37 to play the media, and to update DRM usage data (not shown). The user can, at any time, extract PDMP card 20 from mobile phone 24A, and connect PDMP card 20 to another mobile phone 24B (having a CPU 44B and an operating system 46B, and configured to run applications 48B) via connector 22 with a socket 26B of mobile phone 24B. Mobile phone 24B can be any type of mobile phone that is compatible with PDMP card 20. The system will then behave in the same way, as all files and relevant applications reside on PDMP card 20. It is noted that if the user selects media files that do not support DRM (e.g. MP3 files), then DRM engine 52 is bypassed.

Figure 4:
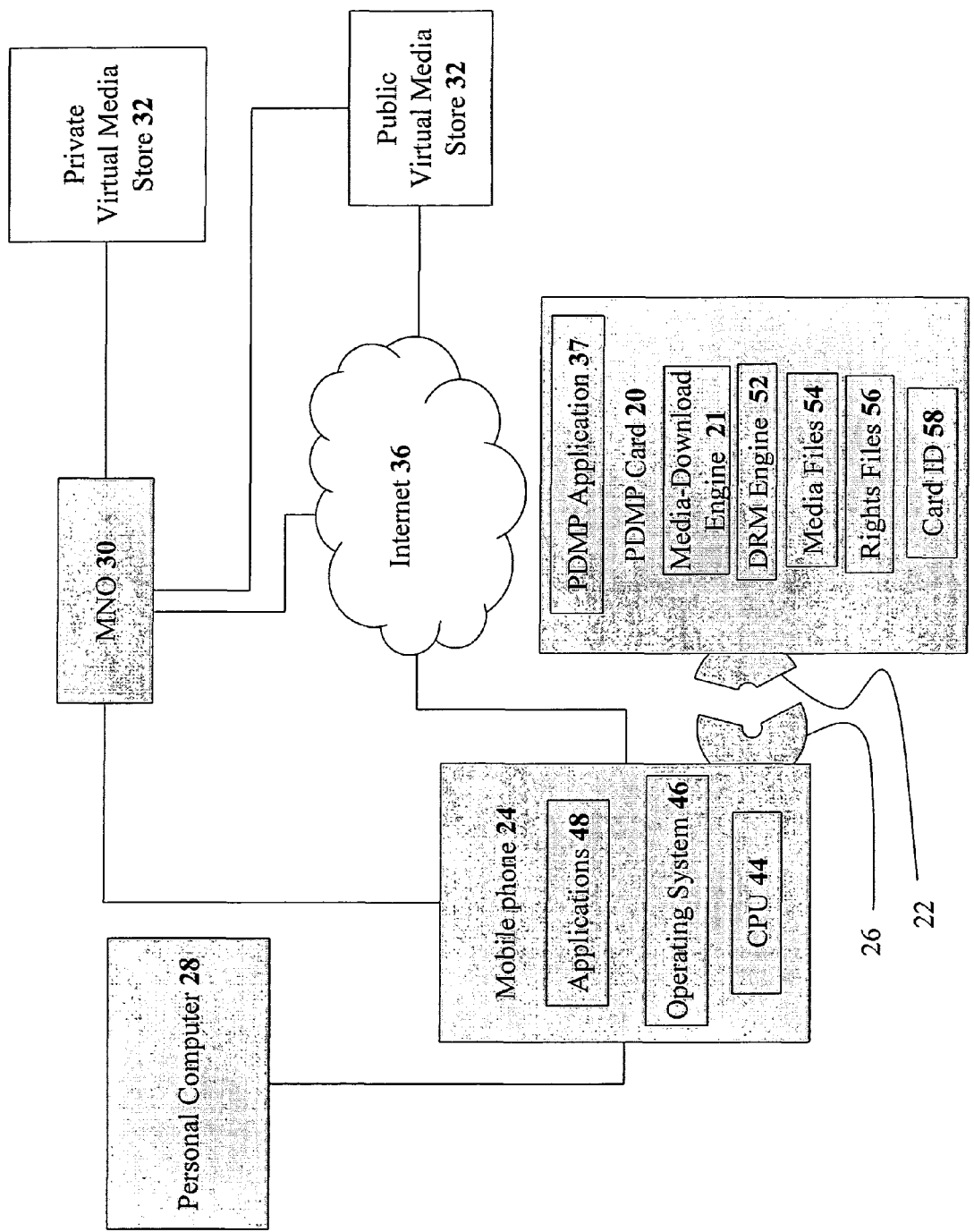
FIG. 4 shows a simplified block diagram of the PDMP card of FIG. 1 obtaining a new media file, according to a preferred embodiment of the present invention.

FIG. 4 shows a simplified block diagram of the PDMP card of FIG. 1 obtaining a new media file, according to a preferred embodiment of the present invention. PDMP card 20 is connected to mobile phone 24 (having a CPU 44 and an operating system 46, and configured to run applications 48) via connector 22 with socket 26. The user launches a mode for purchasing new media in DRM engine 52 on PDMP card 20. DRM engine 52 then connects mobile phone 24 via MNO 30 to private virtual media store 32 (that is accessible only through MNO 30), or connects mobile phone 24 via MNO 30 or via internet 36 to a public media store 34, where the user can select, purchase rights to use, and download new media. As mentioned above, DRM engine 52 only runs when DRM-supported media are selected.

Figure 5:
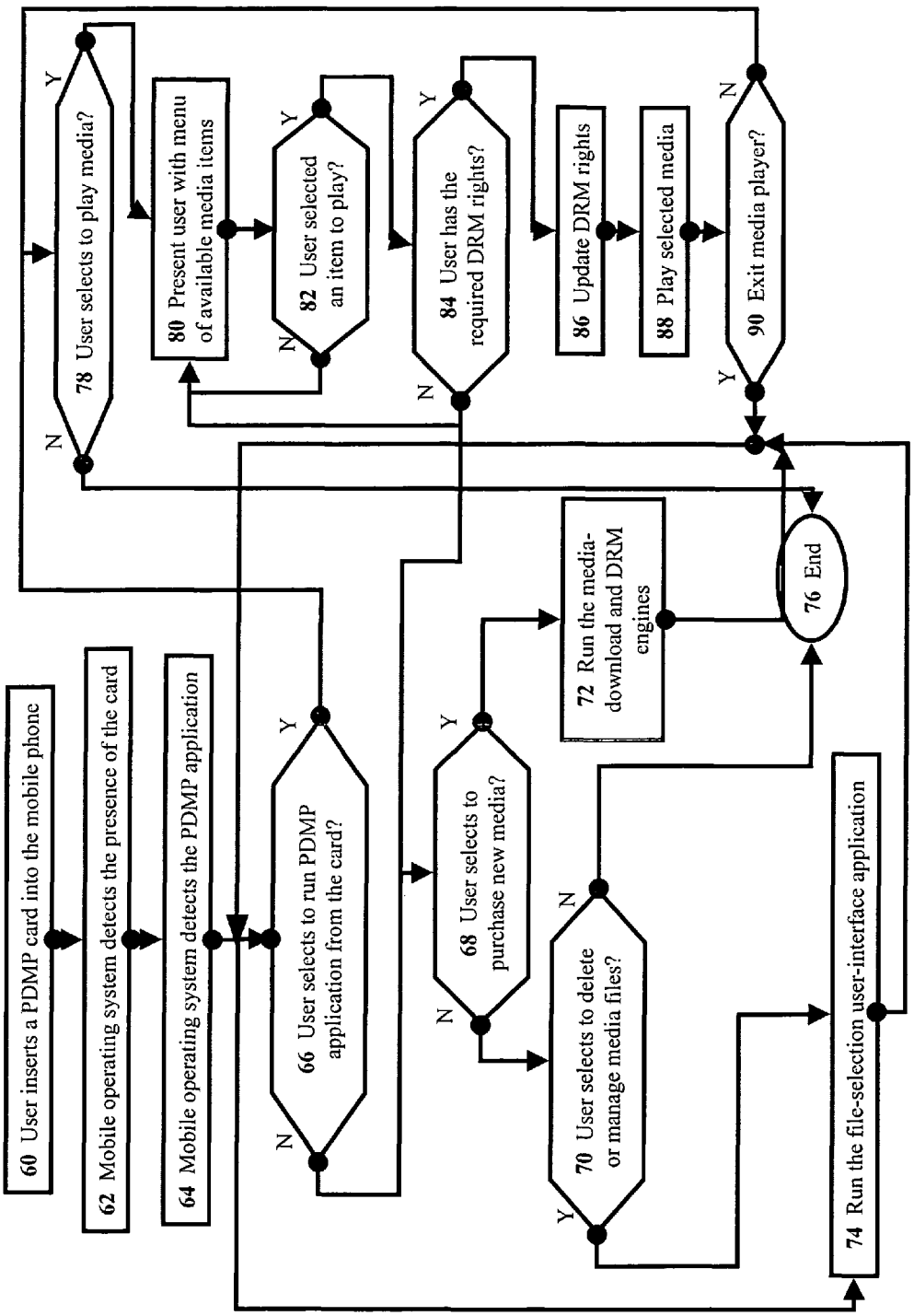
FIG. 5 is a simplified flowchart showing the process flow for using the PDMP card of FIG. 1, according to a preferred embodiment of the present invention.

FIG. 5 is a simplified flowchart showing the process flow for using the PDMP card of FIG. 1, according to a preferred embodiment of the present invention. A user deploys the PDMP card 20 to mobile phone 24 (e.g. inserts PDMP card 20 into mobile phone 24) (Step 60), and mobile phone 24 detects the presence of PDMP card 20 (Step 62). The user then uses the phone interface to browse through the files and applications residing on PDMP card 20. The user can launch any application from PDMP card 20 detected with mobile phone 24 that is compatible with mobile phone 24 (Step 64). The user then selects whether he/she wants to run PDMP application 37 (Step 66).

In one example, if the user does not run PDMP application 37, he/she can choose between purchasing new media files from a media store (Step 68), managing the existing media files (e.g. delete, rename, move into a different directory) (Step 70). If the user chooses to purchase new media, media-download engine 21 and DRM engine 52 launch (Step 72). If the user chooses to manage the existing media files, a file-selection user-interface application launches (Step 74). If the user does not choose either of these options, the process ends (Step 76). If the user selects to play media files after running PDMP application 37 (Step 78), a menu of available media items is presented to the user so he/she can choose which media files to play (Step 80).

As illustrated in the flowchart, for each media file selected (Step 82), the DRM rights of the media files are checked by PDMP application 37 (Step 84), confirmed, and if necessary, updated (Step 86). If there are no DRM rights to play the media file, the user can choose another file (Step 80), or select to purchase rights to this (or other) media (Step 68), or exit the system (Step 76). Once the DRM rights have been established (Step 86), the media file can be played (Step 88), after which the user can choose to exit PDMP application 37 (Step 90). As mentioned above, if media files that do not support DRM are selected, then the checking and updating of DRM rights are skipped (Steps 84 and 86).

According to the examples described above, all applications are running from PDMP card 20 on CPU 44 of mobile phone 24, with the screen and keypad (both not shown) of mobile phone 24 serving as the user interface. When the use of the PDMP functionality is terminated, PDMP card 20 stores any updated media files 54 and DRM rights files 56. Thus, if the user is transferring PDMP card 20 to another compatible phone, the use of the files and applications can be resumed.

While the invention has been described with respect to a limited number of embodiments, it will be appreciated that many variations, modifications, and other applications of the invention may be made.

What is claimed is:

1. A digital media device for providing digital media services to a mobile phone, the device comprising:
    (a) a phone memory card that is reversibly deployable to a port of the mobile phone; and
    (b) a digital media-player application residing on said phone memory card, wherein the combination of the digital media device and the mobile phone is operative to effect a playback of a media file, using said digital media-player application and using at least one of:
        (i) an operating system of the mobile phone;
        (ii) user controls of the mobile phone;
        (iii) a visual display system of the mobile phone, and
        (iv) an audio system of the mobile phone, wherein the digital media-player application is launched from the mobile phone memory card and executed by a processor of the mobile phone.

2. The media device of claim 1, wherein said digital media-player application is operative to execute under said operating system of the mobile phone when said phone memory card is deployed to said port of the mobile phone.

3. The media device of claim 1, wherein said digital media-player application is executable by a CPU of the mobile phone when said phone memory card is deployed to said port of the mobile phone.

4. The media device of claim 1, wherein said port is a mobile phone memory slot.

5. The media device of claim 4, wherein said memory slot is an MMC memory slot.

6. The media device of claim 4, wherein said phone memory card is configured to connect to said memory slot using a Secure Digital™ standard.

7. The media device of claim 1, wherein said combination of the digital media device and the mobile phone is operative to effect an iPOD™ emulation.

8. The media device of claim 1, the device further comprising:
    (c) a digital rights-management engine residing on said phone memory card for providing digital rights-management services for at least one said media file.

9. The media device of claim 8, wherein said digital rights-management engine is operative to handle acquisition of digital media rights for at least one said media file, wherein said handling includes at least one of:
    (i) generating a request for digital rights for at least one said media file; and
    (ii) modifying stored digital rights data for said at least one media file.

10. The media device of claim 8, the device further comprising:
    (d) a digital rights by-pass mechanism invokable upon playback of an unprotected said media file.

11. The media device of claim 1, wherein said digital media-player application is operative to provide video playback services to the mobile phone so that said playback includes video playback.

12. The media device of claim 1, the device further comprising:
    (c) a non-volatile memory for storing at least one said media file, said non-volatile memory residing on said phone memory card,
    wherein said digital media-player application is operative to effect said playback of a said stored media file stored in said non-volatile memory residing on said phone memory card.

13. The media device of claim 12, the device further comprising:

(d) a file-selection user-interface application residing on said memory card for selecting, using the mobile phone, for playback of at least one of:
  (i) a local media file stored in said non-volatile memory; and
  (ii) a remote media file accessible using a communications system of the mobile phone.

14. The media device of claim 13, wherein said file selection user-interface application is a menu-based application.

15. The media device of claim 13, wherein said file selection user-interface application is a search-based application.

16. The media device of claim 12, the device further comprising:
  (d) a media-download engine operative to effect a download, using a communication system of the mobile phone, of at least one said media file into said non-volatile memory.

17. The media device of claim 16, wherein said user controls are configured to control said download engine upon said deployment.

18. The media device of claim 16, wherein said media-download engine is operative to download digital media-player application code on said phone memory card.

19. The media device of claim 1, wherein said digital media-player application resides in read-only non-volatile memory of said memory card.

20. A method for media playback, the method comprising the steps of:
  (a) providing a phone memory card including an on-board digital media-player application; and
  (b) reversibly deploying said phone memory card to a first mobile phone to configure said first mobile phone as a digital media player for playback of digital media files using said on-board digital media-player application, wherein the digital media-player application is launched from the mobile, phone memory card and executed by a processor of the mobile phone.

21. The method of claim 20, wherein said phone memory card includes an on-board digital rights-management application and said deploying is operative to configure said first mobile phone as a digital right-management-enabled-digital media player.

22. The method of claim 20, the method further comprising the step of:
  (c) effecting a playback of a first set of at least one said digital media file stored in said phone memory card, using at least one of:
    (i) an operating system of said first mobile phone;
    (ii) user controls of said first mobile phone;
    (iii) a visual display system of said first mobile phone, and
    (iv) an audio system of said first mobile phone.

23. The method of claim 22, the method further comprising the steps of:
  (d) disengaging said memory card from said first mobile phone;
  (e) deploying said memory card to a second mobile phone different from said first mobile phone; and
  (f) effecting a playback of a second set of at least one said digital media file stored in said phone memory card, using at least one of:
    (i) an operating system of said second mobile phone;
    (ii) user controls of said second mobile phone;
    (iii) a visual display system of said second mobile phone; and
    (iv) an audio system of said second mobile phone.

24. The method, of claim 22, wherein said first set and said second set are the same set.

25. The method of claim 22, the method further comprising the steps of:
  (d) before said effecting of said playback, carrying out at least one of the following:
    (i) confirming DRM media rights for digital media playback on said first mobile phone; and
    (ii) purchasing said DRM media rights using a DRM: application residing on said memory card.

26. The method of claim 20, the method further comprising the step of:
  (c) effecting a downloading of media files into said phone memory card using a communication system of said first mobile phone and an onboard media-download engine residing on said memory card.

27. The method of claim 20, wherein said phone memory card is reversibly-deployable to a second said mobile phone to configure said second mobile phone as a digital media player for playback of digital media files using said on-board digital media-player application.

28. A system for playing media, the system comprising:
  (a) a first mobile phone and a second mobile phone; and
  (b) a media-player card having a media-player functionality when operationally connected to said mobile phones, said media-player card configured to be transferred from said first mobile phone to said second mobile phone, thereby enabling the media to play on either said mobile phone, wherein the media-player card includes a digital media-player application launched from the media player card and executed by a processor of the mobile phone to which the media-player card is connected.

* * * * *

UNITED STATES PATENT AND TRADEMARK OFFICE
CERTIFICATE OF CORRECTION

PATENT NO. : 8,855,714 B2  
APPLICATION NO. : 11/519970  
DATED : October 7, 2014  
INVENTOR(S) : Ayelet Edrey Page 1 of 1

It is certified that error appears in the above-identified patent and that said Letters Patent is hereby corrected as shown below:

IN THE CLAIMS

Column 9, line 42
replace "right-management-enabled-digital media player"
with --rights-management-enabled-digital media player--

Column 10, line 44
replace "either said mobile"
with --either of said mobile--

Column 10, line 45
replace "phone"
with --phones--

Signed and Sealed this
Sixth Day of January, 2015

Michelle K. Lee
*Deputy Director of the United States Patent and Trademark Office*